Patented Apr. 25, 1950

2,504,950

UNITED STATES PATENT OFFICE 2,504,950

2 - AMINO-2-METHYL-4-(3.5 DIAZACYCLO-HEXYL) - 4 - AZA - 1 - PENTANOLS AND THEIR PRODUCTION

Murray Senkus, Terre Haute, Ind., assignor to Commercial Solvents Corporation, Terre Haute, Ind., a corporation of Maryland No Drawing. Application August 21, 1947, Serial No. 769,987

7 Claims. (Cl. 260—251)

This invention relates to new and useful polyamino alcohols and to a method for preparing same. More particularly, it relates to new compounds having the structural formula:

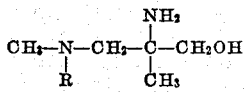

wherein R is a member selected from the group consisting of 3,5-diazacyclohexyl and 1,3,5-substituted-3,5-diazacyclohexyl radicals; and to a method for preparing same.

As illustrative of some of the compounds coming within the scope of the above formula there may be mentioned: 2-amino-2-methyl-4-(1,3,5-trimethyl-3,5-diazacyclohexyl)-4-aza-1-pentanol, 2-amino- 2 -methyl- 4 - ( 1-ethyl-3,5-diisopropyl-3,5-diazacyclohexyl)-4-aza-1-pentanol, 2-amino-2-methyl - 4 -(1-methyl-3,5-dibenzyl-3,5-diazacyclohexyl)-4-aza-1-pentanol, and the like.

The new polyamino alcohols of my invention may be prepared by catalytically hydrogenating 5-nitrotetrahydro-1,3-oxazines in the liquid phase under pressure. These 5-nitrotetrahydro-1,3- oxazines have the following structural formula:

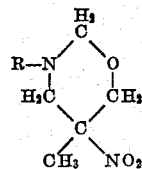

wherein R is a member of the group consisting of 3,5-diazacyclohexyl, and alkyl and phenylalkyl 1,3,5-substituted 3,5-diazacyclohexyl radicals. Specifically, this process is effected by subjecting the aforesaid 5-nitrotetrahydro-1,3-oxazines to hydrogenation at normal or elevated temperatures in the presence of a suitable hydrogenation catalyst and a solvent at a temperature which may vary from about 25° to not substantially in excess of 100° C. In general, any hydrogenation catalyst which is active within the aforesaid temperature range may be employed. For the majority of purposes, however, I have found it preferable to utilize Raney nickel. The hydrogenation reaction, in general, may be effected at hydrogen pressures ranging from about 500 pounds to about 3000 pounds pressure. I have found it preferable, however, to carry out such reactions at a pressure of approximately 1000 pounds per square inch and at temperatures of between about 25° and 70° C. Suitable solvents which may be utilized in the reduction step are the lower aliphatic alcohols such as methanol, ethanol, and the like.

After the reaction is complete, as may be evidenced by the failure of additional hydrogen absorption the catalyst is separated from the reaction mixture by filtration and the solvent is distilled off and the resulting polyamino alcohol is recovered by rectification and further purified, if desired, by fractional distillation under high vacuum.

The 5-nitrotetrahydro-1,3-oxazines employed as starting materials for the production of the compounds of my invention are prepared by reacting equimolecular proportions of a suitable primary amine with a nitro-paraffin having the nitro group attached to a primary carbon atom in the presence of formaldehyde, the latter being present in a molar ratio of about 3:1 of the nitroparaffins and one mole of the primary amine. A more detailed description of the methods by which such compounds can be prepared will be found in my co-pending application, U. S. Serial No. 650,134, filed February 25, 1946, now Patent 2,447,822.

My invention may be further illustrated by the following specific examples.

Example I

Ten grams of 5-nitro-3-(1,3,5-trimethyl-3,5-diazacyclohexyl) -5-methyltetrahydro-1,3-oxazines was hydrogenated in 400 ml. of methanol for 4 hours at 100° C. and 1150 pounds per square inch in the presence of 10 g. of Raney nickel. Rectification of the reduced solution yielded 7 g. of 2-amino-2 - methyl-4- (1,3,5-trimethyl-3,5-diazacyclohexyl)-4-aza-1-pentanol, boiling at 127° C. at 0.3 mm.

Example II

Following the procedure described in Example I, 2-amino-2-methyl-4-(1-ethyl-3,5-diisopropyl-3,5-diazacyclohexyl)-4-aza-1-pentanol, was prepared by hydrogenating 5-nitro-3-(1-ethyl-3,5-diisopropyl-3,5-diazacyclohexyl)- 5 -methyltetrahydro-1,3-oxazine.

Example III

Following the procedure described in Example I, 2-amino-2-methyl-4-(1-methyl-3,5-dibenzyl-3,5-diazacyclohexyl)-4-aza-1-pentanol was produced by hydrogenating 5-nitro-3-(1-methyl-3,5-dibenzyl-3,5-diazacyclohexyl)-5 - methyltetrahydro-1,3-oxazine.

The polyamino alcohols of my invention have been found to be useful in the preparation of numerous organic compounds. Other uses of these compounds will be apparent to those skilled in the art.

This application is a continuation-in-part of my Serial No. 650,135, filed February 25, 1946, now Patent 2,474,792.

My invention now having been described, what I claim is:

1. As new compositions of matter, polyamino alcohols having the following structural formula:

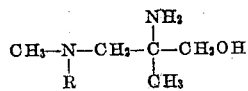

wherein R is a member of the group consisting of 3,5-diazacyclohexyl, and alkyl and phenylalkyl 1,3,5-substituted-3,5-diazacyclohexyl radicals.

2. 2-amino-2-methyl-4-(1,3,5-trimethyl-3,5-diazacyclohexyl)-4-aza-1-pentanol.

3. 2-amino-2-methyl-4-(1-ethyl-3,5-diisopropyl-3,5-diazacyclohexyl)-4-aza-1-pentanol.

4. 2-amino-2-methyl-4-(1-methyl-3,5-dibenzyl-3,5-diazacyclohexyl)-4-aza-1-pentanol.

5. In a process for the preparation of polyamino alcohols having the following structural formula:

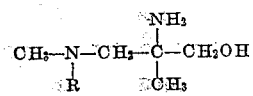

wherein R is a member of the group consisting of 3,5-diazacyclohexyl, and alkyl and phenylalkyl 1,3,5-substituted-3,5-diazacyclohexyl radicals, the step which comprises subjecting to catalytic hydrogenation, 5-nitrotetrahydro-1,3-oxazines having the following structural formula:

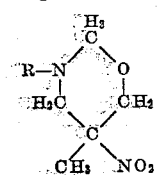

wherein R has its previously defined significance, in the liquid phase, in the presence of a Raney nickel catalyst at a pressure of from about 500 to 3000 pounds per square inch and a temperature of from about 25 to 70° C.

6. In a process for the preparation of polyamino alcohols having the following structural formula:

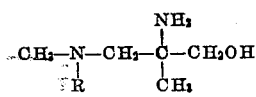

wherein R is a member of the group consisting of 3,5-diazacyclohexyl, and alkyl and phenylalkyl 1,3,5-substituted-3,5-diazacyclohexyl radicals, the step which comprises subjecting to catalytic hydrogenation, 5-nitrotetrahydro-1,3-oxazines having the following structural formula:

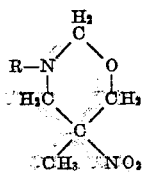

wherein R has its previously defined significance, in the liquid phase, in the presence of an inert solvent and of a Raney nickel hydrogenation catalyst at a temperature of from about 25° to about 100° C. and at a pressure of from about 500 to about 3000 pounds per square inch.

7. The process which comprises subjecting 5-nitro-3-(1,3,5-trimethyl-3,5-diazacyclohexyl-5-methyltetrahydro-1,3-oxazine to the action of hydrogen under conditions of temperature between 25 and 100° C. and pressure between 500 and 3000 pounds per square inch in the presence of a Raney nickel catalyst and in the liquid phase, and recovering the resulting 2-amino-2-methyl-4-(1,3,5-trimethyl-3,5-diazacyclohexyl)-4-aza-1-pentanol, thereby produced.

MURRAY SENKUS.

No references cited.